3,133,520
AUTOMATIC TURN CONTROL SYSTEM
Jerome Bentkowsky, Charlottesville, Va., Joseph H. Chadwick, Jr., Amityville, N.Y., and Virgel E. Williams, Charlottesville, Va., assignors to Sperry Rand Corporation, Great Neck, N.Y., a corporation of Delaware
Filed Apr. 17, 1962, Ser. No. 188,117
18 Claims. (Cl. 114—144)

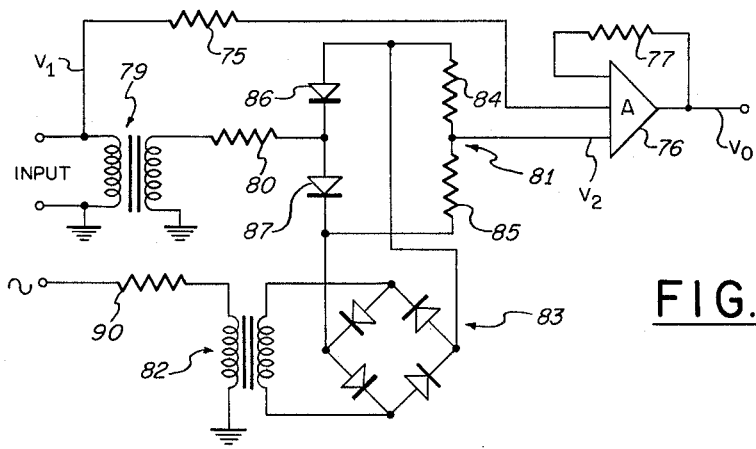
FIG.2.
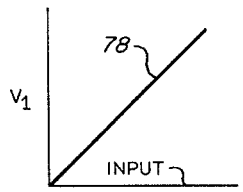
FIG.3.
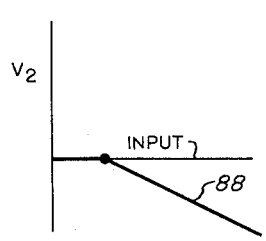
FIG.4.
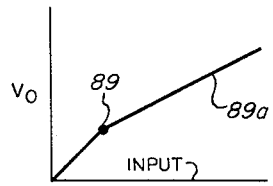
FIG.5.
FIG.6.
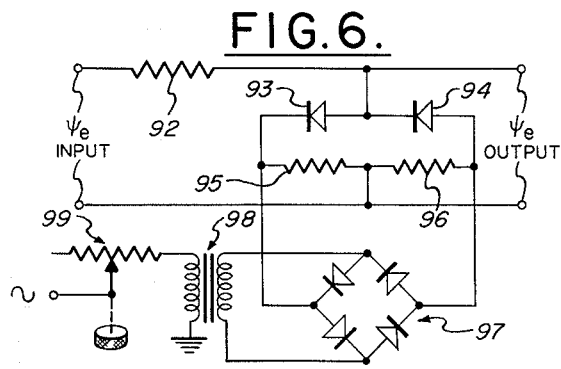
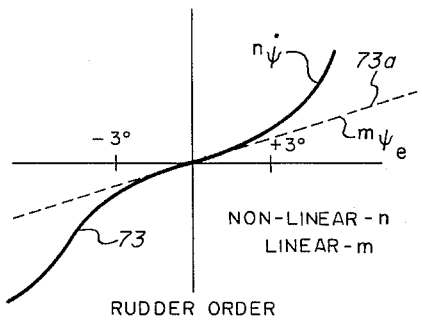
FIG.7.
FIG.8.
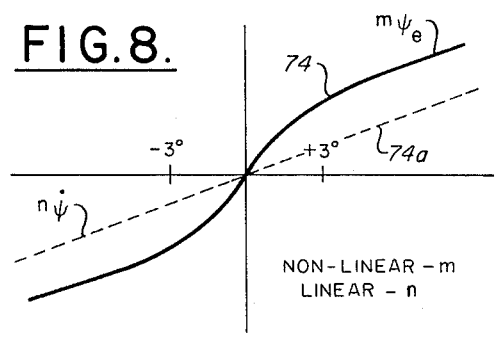
INVENTORS
JEROME BENTKOWSKY
JOSEPH H. CHADWICK JR
VIRGEL E. WILLIAMS
BY
ATTORNEY

# United States Patent Office 3,133,520
Patented May 19, 1964

This invention relates to a system for automatically steering a navigable craft. More particularly, the invention concerns an automatic turn control system for craft of the marine type such as a submarine with a rudder operable to change the heading of the craft through a range of 180 degrees in a smooth and well damped turn utilizing the entire turning rate capacity of the vessel.

Heading changes of this range were not generally attained in known steering systems due to the sinusoidal character of the heading error input to the rudder and the fact that the sensitivity adjustments of the heading error channel and turn rate channel were unrelated and independent of the magnitude of the heading error and turn rate inputs to the rudder. Whenever large heading changes have been attempted, it has been necessary to severely limit the rudder angles, thereby severely limiting the turning rate capability of the vessel. Turns are properly damped in conventional steering systems where the order requires a relatively small heading change and the sensitivities of the heading error and turn rate channels to the rudder are adjusted accordingly. As the ordered turns increase above a magnitude, for example, of 10 degrees for a particular sensitivity adjustment, such systems perform in an increasingly underdamped manner with the craft swinging beyond the ordered heading in the turn. Changing the sensitivities of the channels to obtain proper performance at the greater turn results in an overdamped performance of the system for smaller heading changes. Heading changes above the noted 10 degrees in magnitude in such systems are executed as a succession of independent steps each of which is within the limitations included therein thusly preventing the craft from overswinging its ordered heading.

In accordance with the present invention, the noted system limitations are avoided by means of a non-linear sensitivity adjustment in one of the rudder input channels and a linear sensitivity in the other of the rudder input channels, the provided sensitivities being such that the maximum turning rate of the vessel can be achieved. The improved system further includes means for limiting the heading synchro input to the rudder to insure the maintenance of the noted relation throughout its 180 degree range of properly damped performance. Equivalent performance is attained with the linear and non-linear sensitivity adjustments in either the heading error input channel or the turn rate input channel of the improved system.

In steering marine craft, it is not always desirable to make a turn at the maximum turn rate for the craft's speed. Turns are often accordingly made at a rate that prevents the craft from exceeding safe tilt limits with relation to its roll axis. Known types of steering systems make no provision for selecting the desired turn rate of the craft during a particular maneuver. Practices in known systems ineffectively attempt to attain this result by limiting the travel of the rudder and by dialing in a heading change slowly through manual control by the helmsman of the setting knob connected to the heading order indicator.

In the improved steering system, the ratio of turn rate to speed provides an equivalent to the reciprocal of the turning radius of the craft. Reciprocal turn radius is approximately equal to the relative turn rate or ratio of the actual turn rate to the maximum turn rate obtainable for a particular craft speed. This enables the system to operate to turn the craft at a rate below and up to its maximum turn rate for a particular craft speed without special manipulation of the heading order knob or the use of rudder angle limits.

The primary object of the present invention is to provide a system for automatically steering a craft to an ordered heading up to 180 degrees from the initial heading of the craft by a single operation of the helmsman at the setting knob of the heading order indicator.

One of the features of the improved system is provided by the means included to adjust the turning sensitivity of the rate output means to the rudder either linearly or non-linearly.

Another of the features of the improved system is provided by the means included to adjust the turning sensitivity of the heading error output means to the rudder either linearly or non-linearly.

A further feature of the invention is provided by the included display panel with heading order, turn rate and heading indicators, and with a movable element with a part readable on the scale of the heading indicator and a part readable on the turn rate indicator.

Other objects, features and structural details of the invention will be apparent from the following description with relation to the accompanying drawings wherein:

FIG. 2 is a representative circuit detail of the sensitivity adjustment components of the system shown in FIG. 1;

FIGS. 3, 4 and 5 are curves illustrating the linear and non-linear character of the outputs of the respective adjustment components of the system;

FIG. 6 is a representative circuit detail of the limiter component included in the heading error output channel of the system;

FIG. 7 is a curve illustrative of the $\dot{\psi}$ limit included in the system where the sensitivity components "$m$" and "$n$" thereof are respectively linear and non-linear; and FIG. 8 is a curve illustrative of the $\dot{\psi}$ limit included in the system where the sensitivity components "$m$" and "$n$" thereof are respectively non-linear and linear.

Figure 1:
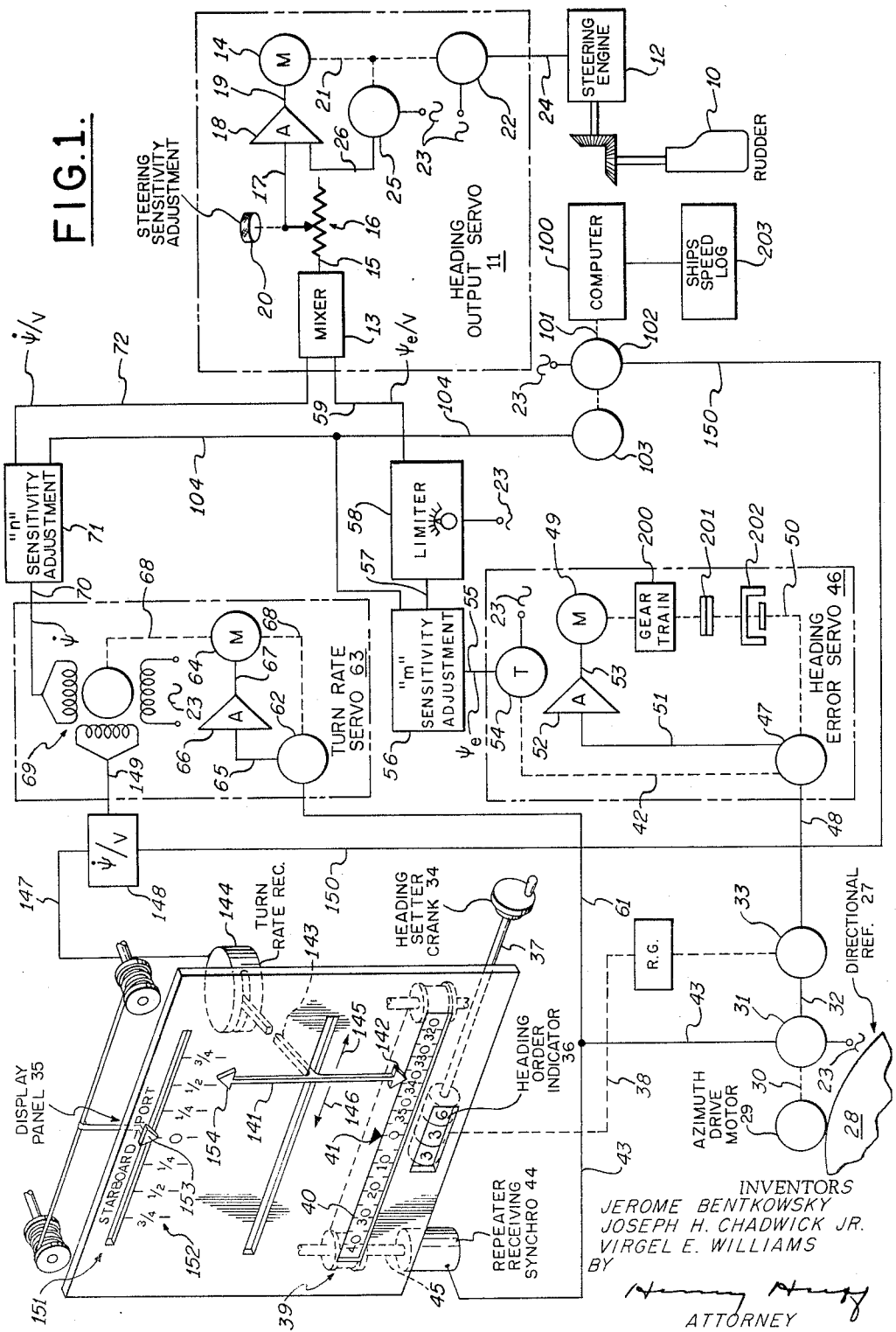
FIG. 1 is a schematic diagram showing the related components of our improved automatic steering system.

The automatic steering system shown in FIG. 1 has particular utility in response to helm orders to turn a navigable craft such as a submarine or surface ship through its rudder about its yaw axis from one heading to another heading over a range of 180 degrees by a single manual operation of the helmsman. The system operates to bring the craft to its ordered heading quickly, accurately and smoothly without overshooting.

As shown in FIG. 1, the primary craft component utilized in the improved system to steer or turn the craft is provided by a rudder 10 that is driven by suitable servo means operatively connected thereto. The servo means shown includes a heading output servo 11 and a steering engine 12 connected to the rudder 10 through suitable gears and shafting. As further shown in FIG. 1, the servo 11 of the system includes a mixer 13 for combining the heading error $\psi_e$ and turn rate $\dot{\psi}$ outputs. A motor 14 of the servo 11 is operatively connected to the mixer 13 by way of lead 15, a potentiometer 16 lead, 17, amplifier 18 and lead 19. Potentiometer 16 provides a steering sensitivity adjustment for the system that is controlled by a manually settable knob 20 connected to its slider. The output shaft 21 of motor 14 drives the rotor of a suitable transmitter or synchro 22 that is energized from a suitable source of electrical power indicated at 23. Lead 24 connects the driving synchro 22 to the steering engine 12 to control its operation. Servo 11 also includes a repeatback output for the drive motor 14 in the arrangement shown in the form of an electrical transmitter or synchro 25 whose rotor is positioned in accordance with the motor output shaft 21. As shown, synchro 25 is energized from the power source 23 and is connected as an input to the motor 14 by way of lead 26 to amplifier 18 and lead 19.

The means provided in the improved system for changing the heading of the craft to an ordered heading include the components having inputs to the heading error $\psi_e$ channel to the mixer 13. As shown in FIG. 1, one of such components is a directional reference 27 represented as a suitable gyro compass whose follow-up ring 28 is positioned by an azimuth drive motor 29. The output shaft 30 of motor 29 of the reference 27 stabilizes the motor of a suitable compass transmitting synchro 31 that is energized from the power source 23.

As shown, the reference synchro 31 is a part of a data transmission arrangement with a second syncro 33 whose stator is connected to lead 32 and whose rotor is connected to a manually movable order member in the form of a crank 34 located at the instrument panel of the craft on a display panel 35 in front of the helmsman. Panel 35 includes a heading order indicator 36 with a movable part in the form of a three digit counter with representative numerical directional indicia thereon. Shaft 37 connects the crank 34 and the movable part of the order indicator 36 and shaft 38 is provided between the movable part of the indicator and the rotor of synchro 33. As shown, the shaft connections between synchro 33 and indicator 36 includes a suitable reduction gearing indicated at R.G. The order synchro 33 of this arrangement is connected to the reference synchro 31 and to the heading setter crank 34 or manually movable order member. The input to the heading error $\psi_e$ channel of the system from synchro 33 is dependent upon the movement of the order member or crank 34. The indicator 36 shows the heading ordered by the helmsman for the craft to be 336 degrees.

The display panel component 35 of the improved system also includes a heading indicator 39 of the compass type having relatively movable scale part 40 and pointer part 41. The scale part of the indicator 39 shown is a stabilized compass card having directional indicia thereon of the character used in the order indicator 36. The pointer 41 is a fixed lubber line on the face of the display panel 35. In turns, the card appears to move with relation to the fixed line 41 although the helmsman reading the indicator 39 actually moves with the fixed line 41 around the stabilized card as the craft moves. As read on the heading indicator 39, the craft is shown to be turning to port through a northerly or zero degree heading as it approaches the ordered heading of 336 degrees. The directional stabilization required for the card 40 in the type of heading indicator 39 included on the display panel 35 is provided by slaving the card or movable scale part 40 to the utilized directional reference 27 through compass transmitting synchro 31. Synchro 31 of the arrangement shown is connected to the card 40 through connecting lead 43 and a repeater receiving synchro 44 whose rotor is operatively connected to the card 40 through shaft 45. At the completion of the turn, the reading of indicator 39 will correspond to that of the order indicator 36 with the relation between card 40 and lubber line 41 being such as to indicate that the craft is on a 336 degree heading. The ordered input from synchro 33 to the $\psi_e$ channel nulls at the same time as that of the reference synchro 31 as the craft arrives at the ordered heading.

As further shown in FIG. 1, the $\psi_e$ channel of the improved system also includes a heading error servo 46 with a receiving synchro 47 whose stator is connected by lead 48 to the stator of the order synchro 33. The output of the data transmission system including synchros 31, 33 and 47 is driven to null by a follow-up motor 49 with an output shaft 50 connected to the rotor of synchro 47 through gear train 200, slip clutch 201, and limit stop 202. As shown, the follow-up motor 49 is operatively connected to the stator of the receiving synchro 47 through lead 51, amplifier 52 and lead 53. The heading error output $\psi_e$ provided by the combined data system and servo 46 is obtained from an electrical transmitter or syncro 54 whose rotor is connected to the rotor of synchro 47 by shaft 42. As shown, the synchro 54 is energized from the power source 23 and its output winding supplies the considered error output $\psi_e$ to the servo mixer 13 by way of lead 55 an "$m$" sensitivity adjustment 56, lead 57, maximum turning rate limiter 58, and lead 59. The $\psi_e$ channel components described provide a means for changing the heading of the craft to an ordered heading that provides a heading error output until at the completion of the turn both the reference synchro 31 and order synchro 33 have a null output to the data system and the motor 49 is accordingly driven to null the output of the synchro 54. Limit stop 202 provides a means of limiting the angular rotation of synchros 54 and 47. The output of these synchros is proportional to the sine of the heading error $\psi_e$. Were the angular rotation not limited, heading errors of greater than 90 degrees will be indistinguishable from those representing the supplement of this angle. Thus, for example, were a 170 degree heading error called for, the system, in the absence of the limit stop, would order a heading error equivalent to 10 degrees, thereby compromising the system performance. Limit stop 202 is set typically at $\pm 60$ degrees of heading error. Slip clutch 201 provides protection for gear train 200 when it reaches the stop.

The rate channel of the improved system includes means for providing an output in accordance with the rate of turn of the craft about its yaw axis. The maneuver is initiated by the helmsman at the display panel 35 upon movement of the setter crank 34 to order the craft to turn to port to a heading shown in FIG. 1 for example to be 336 degrees. The resulting movement of the rotor of the order synchro 33 drives motor 49 to provide an error output $\psi_e$ from synchro 54 to the mixer 13 to operate the motor 14 of servo 11 and operate the steering engine 12 to turn the rudder and start the craft moving about its yaw axis. In the improved automatic steering control system, the rate output $\dot{\psi}$ to mixer 13 is provided by compass transmitting synchro 31. Synchro 31 is connected through lead 43 and connecting lead 61 to a repeater receiving synchro 62 of a turn rate servo 63. The follow-up motor 64 of the servo 63 is driven by the output of the data transmitting system including synchros 31 and 62 by way of lead 65, amplifier 66 and lead 67. The rotor of the receiving synchro 62 is driven to null by the output shaft 68 of motor 64. Motor 64 is accordingly operated at a rate that is dependent on the rate that the craft is turning about its yaw axis as the stator of synchro 31 moves with the craft in the turn with respect to its stabilized rotor. As shown, the motor 64 also drives a generator 69 through the output shaft 68, the generator including an exciting winding energized from source 23 and an output winding connected to the mixer 13 by way of lead 70, an "$n$" sensitivity adjustment 71 and lead 72. The output $\dot{\psi}$ of generator 69 in the improved system is accordingly dependent on the craft's actual turn rate.

In accordance with the present invention, properly damped turns of a magnitude up to 180 degrees are obtained through operation of the motor 14 of the provided servo means by the combined $\psi_e$ and $\dot{\psi}$ outputs where the turning sensitivity of one of the outputs is adjusted linearly and the turning sensitivity of the other of the outputs is adjusted non-linearly. Limits are provided for the desired turning rate of the craft by limiting the $\psi_e$ input to the system. Equivalent performance is attained with the respective linear and non-linear sensitivity ratio adjustments in either the heading error channel or the turn rate channel of the system. The curves 73 and 73$a$ in FIG. 7 show the relation between the respective rudder orders provided by the $\psi_e$ and $\dot{\psi}$ outputs when the "$n$" sensitivity multiplying $\dot{\psi}$ is non-linear and the "$m$" sensitivity multiplying $\psi_e$ is linear. The curves 74 and 74a in FIG. 8 show the relation between the respective rudder orders when the "$m$" sensitivity ratio is non-linear and the "$n$" sensitivity ratio is linear. The related outputs of the respective sensitivity adjustments 56 and 71 combine in mixer 13. The turning rate which the craft will experience is determined by the magnitude of $\psi_e$ and the sensitivities "$m$" and "$n$." By limiting the magnitude of the signal $m\psi_e$ by means of limiter 58, the heading error signal which is fed into mixer 13 will be that corresponding to a much smaller heading error, and the maximum turning rate the craft will experience in a large heading change will be appropriately limited.

The linear and/or non-linear adjustments 56 and 71 of the improved system may be provided by a two channel circuit of the type shown in FIG. 2 where the output $\psi_e$ and $\dot{\psi}$ may be adjusted as desired. As a non-linear adjusting means the circuit shown in FIG. 2 combines two voltages and determines a breakpoint at which the slope of the related voltages change. As represented in FIGS. 2 and 3, the voltage $V_1$ channel is directly connected through resistor 75 to a summing amplifier 76. The voltage output $V_0$ of amplifier 76 is fed back to the amplifier through a feedback resistor 77 which controls the gain of the sensitivity adjustment. Here, as shown by curve 78 in FIG. 3, there is a linear relation between the input and the channel voltage $V_1$, the slope of the curve being determined by the ratio of the resistors 75 and 77. In the voltage $V_2$ channel, the input is fed to the primary of a transformer 79 which provides 180 degree phase reversal. The output of the transformer 79 is then fed the amplifier 76 by way of a network including resistor 80 and a dead zone circuit 81. As shown, the dead zone circuit 81 consists of a reference transformer 82, a full wave direct current bridge 83, a pair of voltage splitting resistors 84 and 85 and a pair of limiting diodes 86 and 87. This channel represents an open circuit for relatively low voltage inputs and a short circuit for relatively high voltage inputs. Here as shown by curve 88 in FIG. 4 there is a linear relation between the input and the channel voltage $V_2$. The difference between the slopes of the curves 78, 88 is determined by the transformer 79 and the resistor 80. The breakpoint 89 shown in curve $89_a$ in FIG. 5 relating the output $V_0$ of the amplifier 76 to the provided input is determined by the reference input to transformer 82 as adjusted by a resistor 90.

In order to limit the maximum turning rate of the maneuver, the system further includes the noted limiter 58 in the heading error output channel between the adjustment 56 and the mixer 13. The input to the mixer 13 from error synchro 54 is accordingly prevented from exceeding a desired limit. As shown in FIG. 6, limiter 58 in the $\psi_e$ channel includes a series resistor 92 and a parallel circuit including a pair of diodes 93, 94, a pair of splitting resistors 95, 96, a bridge 97, a reference transformer 98, and a potentiometer 99 for adjusting the excitation of the transformer from the source 23. The voltage at which limiting occurs is determined by the output voltage of the transformer 98, the output waveform of the limiter 58 remaining essentially sinusoidal.

The improved system further includes means operatively connected to the servo means for automatically adjusting the system in accordance with the speed of the craft. As shown in FIG. 1, such means includes a speed computer 100 operated by the output of a suitable ship's speed log 203 whose output shaft 101 is connected to move the rotor of synchro 102 which is energized from source 23, and to the "$m$" and "$n$" sensitivity adjustments 56 and 71 through lead 104 and suitable dividing means. In operation, the outputs of the sensitivity adjustments "$m$" and "$n$" are made to vary approximately as the reciprocal of speed (1/V) in order to provide smooth, well-damped performance. The inputs from the respective channels into mixer 13 are thus also proportional to the reciprocal of the speed of the craft. Limiter 58 in the $\psi_e$ channel also operates to control the crafts turning rate depending on the output $\psi_e$/V of the adjustment 56. The system operates to control the craft during the turn as a ratio of the turn rate $\dot{\psi}$ to speed V which provides a value equivalent to the reciprocal of the crafts turning radius. This value is approximately equal to the relative turn rate or ratio of the actual turn rate to the maximum turn rate obtainable for a particular craft speed. After the helmsman has set in the ordered heading on the indicator 36 in a single operation, the system functions to bring the craft to the ordered heading smoothly and without overshooting at a turn rate that is below or up to its maximum rate for a particular speed. No rudder limits are required in the improved automatic system because of the included "$m$" and "$n$" sensitivity adjustments 58 and 71, and the maximum turning rate limiter 58.

The improved system accordingly includes means for combining the heading error and turn rate outputs that includes means for adjusting the sensitivity of one of the outputs linearly, and means for adjusting the sensitivity of the other of the outputs non-linearly.

The point in the turn at which the combined inputs of the synchros 31 and 33 is zero and motor 47 reverses its sense of operation is indicated to the helmsman on the display panel 35 by a movable element 141 with a pointer part 142 readable on the scale of the heading indicator 39. At this designated pull-out point in the maneuver, the system automatically exerts reverse rudder to slow the turn so that when the craft reaches the ordered heading its turn rate will be nil and the rudder will be streamlined. As observed by the helmsman on the display panel 35 of the system, this point occurs when the present reading of 336 degrees of the pointer part 142 of movable element 141 on compass card or scale 40 corresponds to the ordered heading of 336 degrees set in the indicator 36 at the start of the maneuver. It is noted that the heading shown by the present indication between card 40 and fixed lubber line 41 is zero degrees so that the craft in the turn is still 24 degrees away from its ordered heading. At the completion of the maneuver the positions of pointer part 142 and lubber line 41 will coincide and their reading on the card 40 will be the ordered 336 degrees. The element 141 of the display panel 35 is a vertical arm supported by the actuating piece 143 of a turn rate receiver 144 for movement across the face of the panel in the direction of the arrows 145 and 146. With no input to the receiver 144, the piece 143 is biased so that the pointer part 142 will be at the center of the panel at a position corresponding to the compass lubber line 41. The operation of receiver 144, as shown in FIG. 1, is dependent on the turn rate $\dot{\psi}$ of the craft as well as its speed V. The input to receiver 144 of the system is by way of lead 147 from a $\dot{\psi}$/V divider 148. The $\dot{\psi}$ input to divider 148 is derived from a second winding of the rate generator 69 of servo 63 by way of lead 149. A lead 150 connects the output of the speed synchro 102 to the divider 148.

The display panel 35 of the system also includes a turn rate indicator 151 with a fixed scale part 152 and an unused movable pointer part 153 that is shown in the index position of the scale part 152. A second pointer part 154 of the element 141 is readable on the scale 152 of the indicator 151 to indicate to the helmsman the turn rate of the craft at the pull-out point of the maneuver as well as the condition of operation of the system as the turn rate of the craft changes during the maneuver with respect to the zero center reading of the turn indicator scale 152.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for automatically steering a navigable craft including servo means operable to turn the craft having a synchro providing a repeatback output; means for changing the heading of the craft to an ordered heading providing a heading error output including a directional reference having a synchro with a heading input, a manually movable order member, a heading order indicator with a movable element connected to the member, and an order synchro connected to the member having an input depending on the movement of the order member; means for providing an output in accordance with the rate of turn of the craft; means for combining the heading error output and turn rate output including means for adjusting the sensitivity of one of the outputs linearly, means for adjusting the sensitivity of the other of the outputs non-linearly and means for limiting the adjusted output of said heading error output means; and means operatively connecting said combining means and repeatback synchro to the servo means.

2. In a system for automatically steering a navigable craft having servo means operable to turn the craft; means for changing the heading of the craft to an ordered heading providing a heading error output including a directional reference having a synchro with a heading input, a manually movable order member, a heading order indicator with a movable element connected to the member, and an order synchro connected to the member having an input depending on the movement of the order member; means for providing an output in accordance with the rate of turn of the craft; means for adjusting the sensitivity of one of the outputs of the heading error means and turn rate output means linearly, means for adjusting the sensitivity of the other of the outputs non-linearly; and means operatively connecting said linear adjusting means and non-linear adjusting means to said servo means.

3. A system as claimed in claim 2, in which the means operatively connecting the linear and non-linear adjusting means to the servo means includes means providing an output in accordance with the speed of the craft.

4. A system as claimed in claim 2, in which the adjusting means for said turn rate output means is linear, and the adjusting means for said heading error output means is non-linear.

5. A system as claimed in claim 2, in which the adjusting means for said turn rate output means is non-linear, and the adjusting means for said heading error output means is linear.

6. A system as claimed in claim 2, in which said operatively connecting means includes means for limiting the adjusting means for the heading error output means.

7. A system as claimed in claim 2, including a display panel having said heading order indicator thereon, a heading indicator on said panel with relatively movable heading scale and pointer parts, and a movable element with a part readable with relation to the heading scale, and means connected to operate the movable element of said display panel in accordance with the turn rate and speed of the craft.

8. A system as claimed in claim 2, including output means for adjusting the system in accordance with the speed of the craft, a display panel having said heading order indicator thereon, a turn rate indicator on said panel having a fixed scale, a heading indicator on said panel with relatively movable scale and pointer parts, and a movable element with a part readable on the scale of the heading indicator and a part readable on the scale of the turn rate indicator, and means depending on the output of said turn rate output means and the output of said speed adjusting means operatively connected to the movable element of said display panel.

9. A system for automatically steering a navigable marine craft with a rudder including servo means operatively connected to the rudder having a synchro providing repeatback output; means for changing the heading of the craft to an ordered heading providing a heading error output including a directional reference having a synchro with a heading input, manually settable means for ordering a change in heading, a heading order indicator with a movable element operatively connected to the settable means, and a synchro with a movable element operatively connected to the reference synchro and the settable means providing an order input; means for providing an output depending on the turn rate of the craft; means for combining the heading error output and turn rate output including means for adjusting the sensitivity of one of the outputs linearly, means for adjusting the sensitivity of the other of the outputs non-linearly and means for limiting the adjusted output of said heading error output means; and means for operating said servo means responsive to the output of said repeatback synchro and the output of said combining means.

10. In a system for automatically steering a navigable marine craft with a rudder including servo means operatively connected to the rudder; means for changing the heading of the craft to an ordered heading providing a heading error output including a directional reference having a synchro with a heading input, manually settable means for ordering a change in heading, a heading order indicator with a movable element operatively connected to the settable means, and an order synchro operatively connected to the settable means providing an order input; means for providing an output depending on the turn rate of the craft; means for adjusting the sensitivity of one of the outputs of the heading error means and turn rate output means linearly, and means for adjusting the sensitivity of the other of the outputs non-linearly; and means operatively connecting said linear adjusting means and non-linear adjusting means to said servo means.

11. A system as claimed in claim 10, in which the means connecting the linear adjusting means and the non-linear adjusting means to the servo means includes means providing an output in accordance with the speed of the craft.

12. A system as claimed in claim 10, in which the adjusting means for said turn rate output means is linear, and the adjusting means for said heading error output means is non-linear.

13. A system as claimed in claim 10, in which the adjusting means for said turn rate output means is non-linear, and the adjusting means for said heading error output means is linear.

14. A system as claimed in claim 10, in which said operatively connecting means includes means for limiting the adjusting means for the heading error output means.

15. A system as claimed in claim 10, including a display panel having said heading order indicator thereon, a compass on said panel with relatively movable card and lubber line parts, and a movable element with a part readable on the compass card, and means connected to operate the movable element of said display panel in accordance with the turn rate and speed of the craft.

16. A system as claimed in claim 10, including output means for adjusting the system in accordance with the speed of the craft, a display panel having said heading order indicator thereon, a turn rate indicator on said panel having a fixed scale, a compass on said panel with relatively movable card and lubber line parts, and a movable element with a part readable on the compass card and a part readable on the scale of the turn rate indicator, and means depending on the output of said turn rate output means and the output of said speed adjusting output means operatively connected to the movable element of the panel.

17. In a system for automatically steering a navigable craft, a display panel including a heading order indicator with a movable element, a heading indicator with relatively movable heading scale and pointer parts, and a movable element with a part readable with relation to the heading scale; means for changing the heading of the craft to an ordered heading including manually settable means connected to the movable element of the order indicator, and means providing an output in accordance with the turn rate of the craft operatively connected to the movable element of the display panel.

18. In a system for automatically steering a navigable craft; a display panel including a heading order indicator with a movable element, a turn rate indicator having a fixed scale, a compass with relatively movable card and lubber line parts, and a movable element with a part readable on the compass card and a part readable on the scale of the turn rate indicator; means for changing the heading of the craft to an ordered heading including manually settable means connected to the movable element of the order indicator, and means providing an output in accordance with the combined speed and turn rate of the craft operatively connected to the two part movable element of the display panel.

References Cited in the file of this patent

UNITED STATES PATENTS

| | | |
|---|---|---|
| Re. 23,819 | West | Apr. 27, 1954 |
| 1,612,434 | Henderson | Dec. 28, 1926 |
| 2,197,890 | Koster | Apr. 23, 1940 |
| 2,863,622 | Cisel | Dec. 9, 1958 |
| 2,945,170 | Jones et al. | July 12, 1960 |
| 3,033,035 | Snodgrass | May 8, 1962 |